(12) United States Patent
Jansen et al.

(10) Patent No.: US 9,772,487 B1
(45) Date of Patent: Sep. 26, 2017

(54) LAMINATION METHOD AND APPARATUS

(71) Applicant: Amazon Technologies, Inc., Reno, NV (US)

(72) Inventors: Hermanus Johannes Jansen, Veldhoven (NL); Jeroen Cornelis van der Gaag, Mierlo (NL)

(73) Assignee: Amazon Technologies, Inc., Seattle, WA (US)

( * ) Notice: Subject to any disclaimer, the term of this patent is extended or adjusted under 35 U.S.C. 154(b) by 245 days.

(21) Appl. No.: 14/134,862

(22) Filed: Dec. 19, 2013

(51) Int. Cl.
*G02B 26/00* (2006.01)

(52) U.S. Cl.
CPC .................................. *G02B 26/005* (2013.01)

(58) Field of Classification Search
CPC G02B 26/005; G02B 2207/115; G09G 3/348; Y10T 428/24479
See application file for complete search history.

(56) References Cited

U.S. PATENT DOCUMENTS

| | | | | |
|---|---|---|---|---|
| 2003/0006003 A1* | 1/2003 | Matsuoka | ............. | G02F 1/1339 156/272.2 |
| 2003/0053190 A1* | 3/2003 | Liang | ................ | C08G 18/5015 359/296 |
| 2009/0133807 A1* | 5/2009 | Amsden | ................ | C03C 23/001 156/105 |
| 2011/0157679 A1* | 6/2011 | Fike, III | ................ | B32B 37/003 359/290 |
| 2011/0205472 A1* | 8/2011 | Kobayashi | ............. | B32B 17/06 349/104 |

FOREIGN PATENT DOCUMENTS

NL WO 2012055724 A1 * 5/2012 ........... G02B 26/005

\* cited by examiner

*Primary Examiner* — Daniel McNally
(74) *Attorney, Agent, or Firm* — Lee & Hayes, PLLC

(57) ABSTRACT

Techniques and architectures involving fabricating a display panel, such as an electro-wetting display panel include laminating a first support plate and a second support plate together to form a laminated display panel. The laminated display panel includes an ultra-violet (UV) light curable seal disposed between the first support plate and the second support plate proximate to edges of the laminated display panel. After conveying the laminated display panel to a UV light curing station, pressurized air, gas or fluid is applied to the laminated display panel to produce a pressure on the UV light curable seal between the first support plate and the second support plate. While applying the pressurized air, gas or fluid, the laminated display panel is exposed to UV light to cure the seal.

15 Claims, 5 Drawing Sheets

LAMINATION METHOD AND APPARATUS

BACKGROUND

A method of fabricating a layer of fluid sandwiched between a top substrate and a bottom substrate can involve any of a number of devices, such as a rolling-coupling device, that forces the top and bottom substrates to within a relatively close distance of one another. For example, a bottom and/or top substrate can include a plurality of display cells having cell walls that retain, to a certain extent, fluid. Subsequent to filling the cells with the fluid, a top substrate can be laminated onto the bottom substrate so that the fluid in the cells is hermetically sealed from air and leakage.

Immediately after laminating top and bottom substrates using, for example, a roll-coupling device in the lamination process, an ultra-violet (UV) curing process commences. The UV curing process cures adhesive materials that seal and bond the top and bottom support plates together. Unfortunately, the UV curing process can be relatively slow, thus allowing the laminated structure to relax and at least partially delaminate, resulting in voids between cell walls and the top substrate, for example.

BRIEF DESCRIPTION OF THE DRAWINGS

The detailed description is described with reference to non-limiting and non-exhaustive embodiments illustrated in the accompanying figures. The same reference numerals in different figures refer to similar or identical items.

DETAILED DESCRIPTION

Overview

Figure 1:
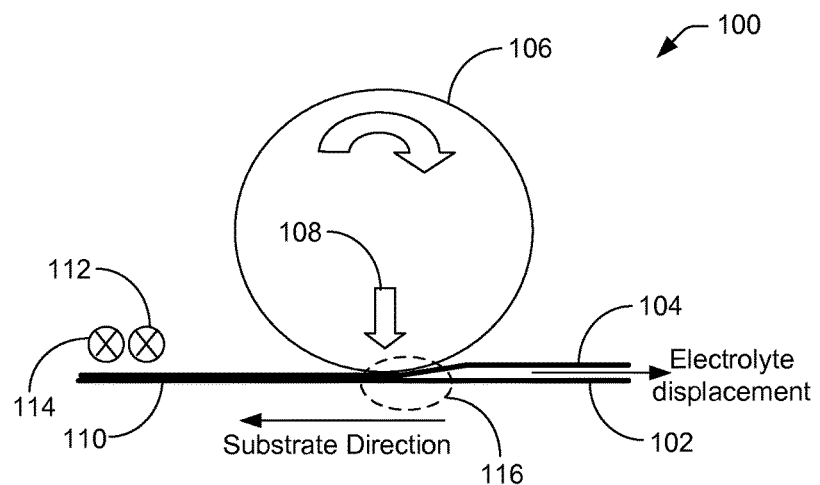
FIG. 1 is a schematic diagram of an apparatus for fabricating a laminated display panel, according to various embodiments.

In various embodiments described herein, techniques and architectures are used to fabricate a display panel, such as an electro-wetting display panel. A display panel includes, among other things, a layer of a first immiscible liquid on a surface of a first support plate, a second immiscible liquid on the layer of the first immiscible liquid, and a second support plate on the layer of the second immiscible liquid. The first support plate includes pixel walls and the second support plate includes spacers and an uncured adhesive seal material disposed proximate to edges of the second support plate. In other embodiments, the first support plate includes spacers and an uncured adhesive seal material disposed at or near edges of the first support plate. Electrowetting displays include individual pixels surrounded by a pixel wall made, for instance, from photoresist material. Pixel walls retain the first immiscible liquid and the second immiscible liquid in the individual pixels.

Though some example embodiments described herein include an electro-wetting display panel, any of a number of liquid or partially liquid-based displays can be included, such as an electrophoretic display, for example. Accordingly, claimed subject matter is not limited to any particular display or display technology.

Initially, the first support plate is separate from the second support plate. After respective elements and structures (e.g., immiscible liquid, pixels walls, spacers, and so on) are placed on the first support plate and the second support plate, the first and second support plates are brought together in a laminating process that forms a laminated display panel. Such a laminating process can involve a roll-coupling device that includes, for example, two opposing rollers that collectively apply a coupling force that forces the top and bottom support plates to within a relatively close distance of one another, thus squeezing the first and second support plates together. As a result, the liquid, pixel walls, and spacers are enclosed by the first and second support plates and the uncured seal material. Shortly after the laminating process, the laminated display panel is exposed to electromagnetic (EM) energy, such as ultraviolet (UV) light or heat, to cure the adhesive seal material. Though some example embodiments described herein include a rolling process to laminate structures (e.g., support plates) together, any of a number of laminating devices can be used. Accordingly, claimed subject matter is not limited to any particular laminating devices or processes, such as a roller or rolling process.

Due to a number of factors, the first and second support plates of the laminated display panel may not remain tightly laminated to one another after the laminating process by the roller: The support plates can pull away from one another in a process of material relaxation, which can lead to undesirable voids between spacers and pixel walls. This can occur before the adhesive seal material has had a chance to cure. For example, the seal material is not cured instantly at the location of the coupling force, such as that applied by the roller. Seal curing is a chemical process that requires some period of time, such as a time period in a range from about a fraction of a second to an hour or more, to complete, for example.

In various embodiments, pressurized gas is applied to the first and/or second support plate to create a coupling force between the support plates and the seal material. In some implementations, such pressurized gas can be applied to the laminated display panel shortly after a roll-coupling laminating process and before, during and/or after application of EM energy to cure the adhesive seal material, as explained below. In other implementations, such pressurized gas can be applied to the laminated display panel in a process that replaces a roll-coupling laminating process (or any other laminating process) and before, during and/or after application of EM energy to cure the adhesive seal material, as explained below. In other words, lamination can be achieved with pressurized gas alone, without rollers. In some implementations, the pressurized gas comprises a pressurized air. Though example embodiments described hereinafter involve pressurized air, any gas (e.g., nitrogen, $CO_2$, and so on) or fluid (e.g., water, oil, and so on) can be used, and claimed subject matter is not limited in this respect.

Example Structures and Processes

FIG. 1 is a schematic diagram of an apparatus 100 for fabricating a display panel, according to various embodiments. For example, the display panel may comprise an electrowetting display that includes an array of pixels. An electrowetting display employs an applied voltage to change the surface tension of a liquid in relation to a surface. For instance, by applying a voltage to a hydrophobic surface, the wetting properties of the surface can be modified so that the surface becomes increasingly hydrophilic. As one example of an electrowetting display, the modification of the surface tension acts as an optical switch by contracting a colored oil film when a voltage is applied to individual pixels of the display. When the voltage is absent, the colored oil forms a continuous film within a pixel, and the color may thus be visible to a user of the display. On the other hand, when the voltage is applied to the pixel, the colored oil is displaced and the pixel becomes transparent. When multiple pixels of the display are independently activated, the display can present a color or grayscale image. The pixels may form the basis for a transmissive, reflective, or transmissive/reflective (transreflective) display. Further, the pixels may be responsive to high switching speeds (e.g., on the order of several milliseconds), while employing small pixel dimensions. Accordingly, the electrowetting displays herein may be suitable for applications such as displaying video and/or static content. In addition, the lower power consumption of electrowetting displays in comparison to conventional LCD displays makes the technology suitable for displaying content on portable display devices that rely on battery power.

In apparatus 100, a bottom support plate 102 and a top support plate 104 are conveyed into apparatus 100 from the right. Though not shown in FIG. 1, bottom support plate 102 and top support plate 104 can be supported from below by a chuck or other type of rigid platform. Bottom support plate 102 and top support plate 104 can comprise borosilicate or sodalime glass having a thickness in the range of about 0.4 to about 1.1 millimeters, for example.

Bottom support plate 102 includes, among other things, pixels walls that form pixels, which are filled with first and second immiscible liquids. Top support plate 104 includes, among other things, spacers and an uncured adhesive seal material, as described in detail below. For example, such adhesive seal material can comprise an epoxy resin, though claimed subject matter is not limited in this respect. First support plate 102 and second support plate 104 are positioned in close proximity to one another upon being presented to apparatus 100. In some implementations, first support plate 102, second support plate 104 and immiscible liquid form a wedge shape as they are presented to apparatus 100. For example, leading edges of first support plate 102 and second support plate 104 can be tacked together before they are presented to apparatus 100. A wedge shape is formed by the rolling process subsequently squeezing out overfilled immiscible liquid. Close to the roller, for example, first support plate 102 and second support plate 104 are approximately parallel to one another and separated by about half a millimeter (or a separation in a range from about 0.1 millimeters to several millimeters). Pixels of bottom support plate 102 are overfilled with the second immiscible liquid (e.g., electrolyte). This is done to assure that the final assembled display will not include air gaps in the pixels. The process of coupling first support plate 102 and second support plate 104 together in apparatus 100 displaces excess second immiscible liquid, which can be collected in a gutter and reused later for fabricating other display panels, for example.

First support plate 102 and second support plate 104 are conveyed to a roller 106 that applies a coupling force 108 to couple first support plate 102 and second support plate 104 together. Interaction between first support plate 102, second support plate 104, and roller 106 occurs in a region 116, which is described in detail below. Roll-coupling first support plate 102 including pixel walls and second support plate 104 including spacers together by roller 106 results in a laminated display panel 110 that encloses first and second immiscible liquids. In other embodiments, the first support plate includes spacers. Coupling also brings spacers of second support plate 104 into physical contact with pixel walls of first support plate 102, as described below. Correspondingly, first support plate 102 and second support plate 104 are spaced apart by, for example, about 25 micrometers, though claimed subject matter need not be so limited. Moreover, coupling forces uncured adhesive seal material of second support plate 104 into physical contact with first support plate 102.

Laminated display panel 110 is subsequently conveyed to a UV-curing station 112 that exposes the uncured adhesive seal material sandwiched between the coupled first support plate 102 and second support plate 104 to EM energy. During such EM energy exposure, an air film apparatus 114 provides pressurized air onto laminated display panel 110 to produce a coupling force between first support plate 102 and second support plate 104. As mentioned above, any gas or fluid can be used, and claimed subject matter is not limited to pressurized air. Accordingly, the term "air film apparatus" is used merely for convenience and such use does not imply that example embodiments described herein are limited to air or an air film.

Figure 2:
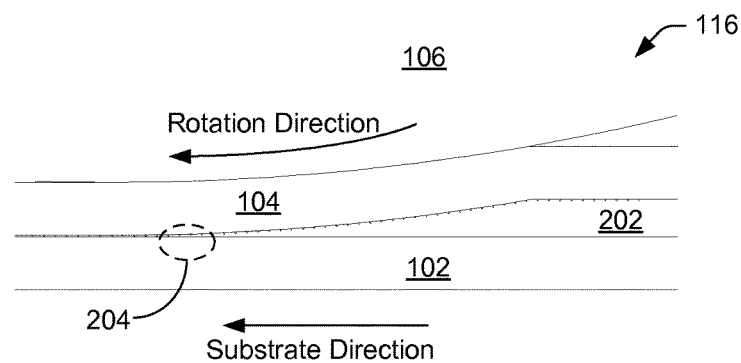
FIG. 2 is a close up view of a region of interaction between a roller and substrates of a display panel, according to various example embodiments.

FIG. 2 is a close up view of region 116, introduced in FIG. 1, where interaction between roller 106, first support plate 102, and second support plate 104 occur. As mentioned previously, first support plate 102 and second support plate 104 are parallel to one another and separated by a gap 202 in a range from about 0.1 millimeters to several millimeters while being conveyed into region 116. Gap 202 is at least partially filled with excess electrolyte that is displayed toward the right in FIG. 2 by coupling force 108 applied by roller 106. Pixel walls on first support plate 102 and spacers on second support plate 104 are brought into contact with one another in region 204, as described in detail below.

Coupling force 108 generates a coupling pressure on first support plate 102, second support plate 104, and the electrolyte. Such coupling pressure can depend on a number of factors such as, for example, the elasticity of the support plates, counter pressure generated by electrolyte (e.g., first and second immiscible liquid on first and second support plates, respectively), electrolyte viscosity, rolling speed of roller 106, and fluid path resistance for displaced electrolyte.

Figure 3:
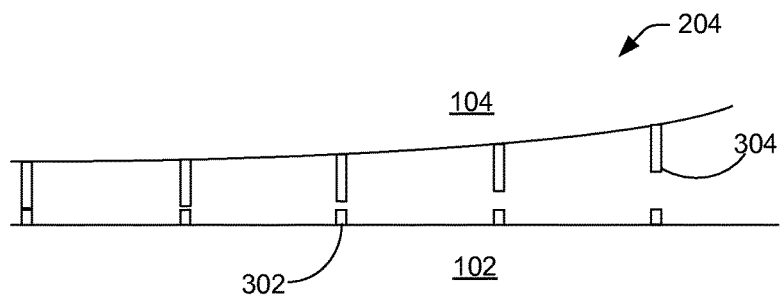
FIG. 3 is a close up view of a region between substrates of a display panel, according to various example embodiments

FIG. 3 is a close up view of region 204, introduced in FIG. 2, between first support plate 102 and second support plate 104. First support plate 102 includes pixel walls 302 and second support plate 104 includes spacers 304. In some implementations, pixel walls 302 are about 4 micrometers tall, and spacers 304 are about 20 micrometers long, though claimed subject matter is not limited to such sizes. For example, sizes of pixel walls 302 and spacers 304 can be much larger or much smaller than the example values stated above. As the support plates move to the left by rotating action of roller 106, pixel walls 302 move closer to spacers 304 until each of spacers 304 and pixel walls 302 are in physical contact with one another. Accordingly, first support plate 102 and second support plate 104 are separated by an amount in a range from about 0.1 millimeters to several millimeters subsequent to roll coupling by roller 106.

Figure 4A:
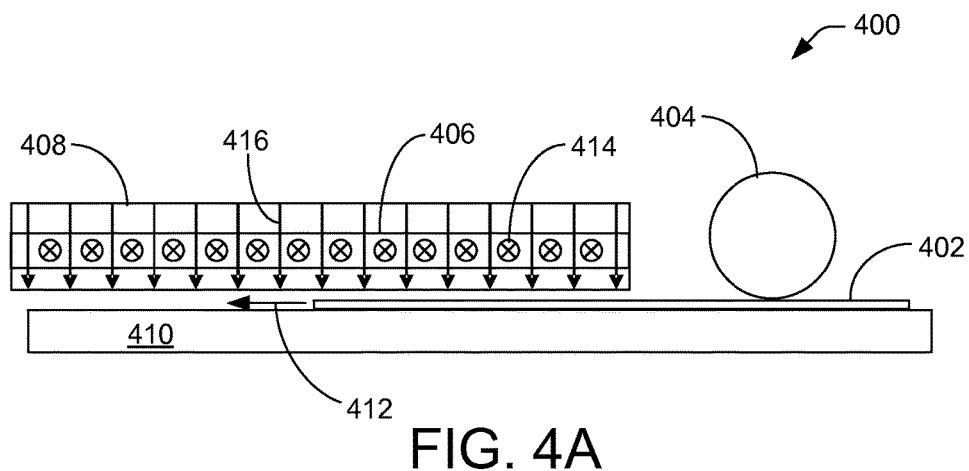
FIGS. 4A and 4B are schematic diagrams of an apparatus for fabricating a laminated display panel, according to various embodiments.
Figure 4B:
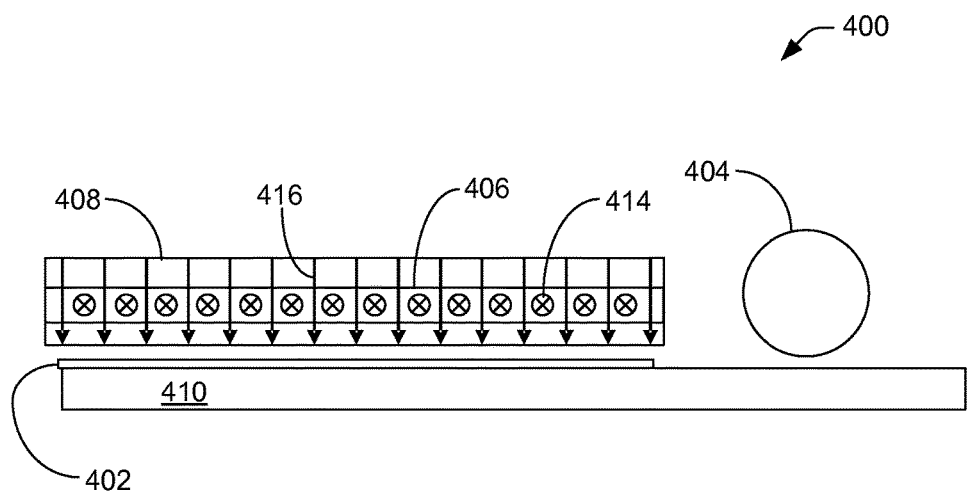

FIGS. 4A and 4B are schematic diagrams of an apparatus 400 for fabricating a laminated display panel, according to various embodiments. Apparatus 400 is similar or the same as apparatus 100 shown in FIG. 1, for example. In FIG. 4A, support plates of a display panel 402 are being laminated together by a roller 404. During this lamination, display panel 402 is being conveyed to a EM energy-curing station 406 and an air film apparatus 408. In FIG. 4B, display panel 402, being recently laminated, has been conveyed to a position for processing by EM energy-curing station 406 and air film apparatus 408.

In FIG. 4A, a chuck 410 supports display panel 402 that is laminated to the left of roller 404 and not yet laminated to the right of roller 404. That is, the portion of display panel 402 to the right of roller 404 comprises support plates that have yet to be laminated or coupled together, as explained above with reference to FIG. 1. As indicated by arrow 412, display panel 402 supported by chuck 410 is conveyed to the left to EM energy-curing station 406 comprising one or more EM energy sources 414 that radiate EM energy onto uncured adhesive seal material of recently-laminated display panel 402. The one or more EM energy sources may comprise an ultraviolet (UV) light source, a heat source or a combined UV light and heat source. In conjunction with EM energy exposure, air film apparatus 408 provides pressurized air via one or more openings 416 onto display panel 402 to produce a coupling force on the uncured seal material.

FIG. 4B shows a position of display panel 402 relative to EM energy sources 414 and air film apparatus 408 shortly after exiting from roller 404. In some embodiments, display panel 402 supported by chuck 410 is conveyed with respect to fixed EM energy-curing station 406 and air film apparatus 408. In other embodiments, conveying can include any combination of relative motion between air film apparatus 408 with respect to EM energy-curing station 406 and/or air film apparatus 408. For example, EM energy-curing station 406 and air film apparatus 408 can be moved into position with respect to display panel 402 and chuck 410 that are fixed.

As display panel 402 is positioned below EM energy-curing station 406 and air film apparatus 408, the adhesive seal material in display panel 402 is subjected to a curing process by EM energy-curing station 406. During such a process, air film apparatus 408 applies pressurized air on display panel 402 to maintain a coupling force on display panel 402 during the curing process. The coupling force is produced by at least partially constraining the pressurized air between display panel 402 and air film apparatus 408 to form a pressurized gas film. Maintaining such a coupling force on display panel 402 assures that first and second support plates of laminated display panel 402 remain tightly pressed to one another even after application of the coupling force by roller 404 has passed. As mentioned above, without pressurized air, the support plates can pull away from one another in a process of material relaxation, which can lead to undesirable voids between spacers and pixel walls. Once the adhesive seal material has had a chance to cure by exposing the seal material to EM energy produced by light-curing station 406 over a period of time, then the physical structure of display panel 402 is stable.

Using pressurized air to maintain a coupling force on display panel 402 provides a number of advantages compared with using other methods of applying a coupling force. For example, pressurized air provides a cushion of air giving rise to a coupling force having a degree of flexibility to accommodate thickness variations in display panel 402. Also, pressurized air can apply a more uniform force over the display panel to provide a display panel having a high degree of mechanical integrity Pressurized air can apply a coupling force while bridging height or thickness differences of display panel 402. On the other hand, a rigid or semi-rigid plate held against display panel 402 during curing may not sufficiently accommodate thickness variations in display panel 402, and thus introduce uneven stresses or pressure points across display panel 402. Also, such a plate may not efficiently transmit EM energy and thus at least partially block EM energy from reaching portions of display panel that include seal material. Another advantage of using pressurized air is that pressurized air can simultaneously apply a coupling force and allow lateral movement of display panel 402. Yet another advantage of using pressurized air is that pressurized air can provide a coupling force on display panel 402 in a region wherein display panel 402 is exposed to EM energy. On the other hand, in a situation without pressurized air, the only coupling force is that applied by roller 404, which is in a region without EM energy. Such advantages can allow for flexibility of a process of fabricating display panel 402.

In some embodiments, a distance between roller 404 and the one or more openings 416 is less than a length of display panel 402 being formed by roller 404. Further, at least a portion of display panel 402 is exposed to EM energy from EM energy sources 414 while at least another portion of display panel 402 remains in roller 404. In other words, in some embodiments, portions of display panel 402 can be exposed to seal material-curing EM energy while other portions of display panel 402 are being roll-coupled by roller 404.

In other embodiments, a distance between roller 404 and one or more light sources 414 is less than a length of display panel 402 being formed by roller 404. Further, at least a portion of display panel 402 is exposed to pressurized air generated by air film apparatus 408 while at least another portion of display panel 402 remains in roller 404. In other words, in some embodiments, portions of display panel 402 can be subjected to pressurized air to impart a coupling force to display panel 402 while other portions of display panel 402 are being roll-coupled by roller 404.

Figure 5:
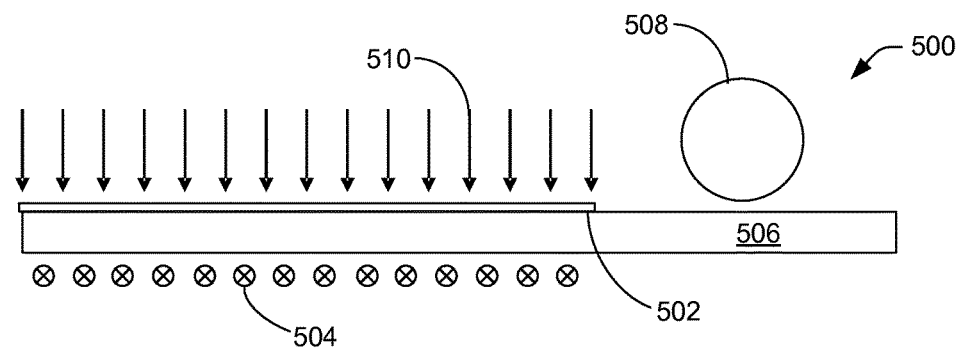
FIGS. 5 and 6 are schematic diagrams of an apparatus for fabricating a laminated display panel, according to various embodiments.

FIG. 5 is a schematic diagram of an apparatus 500 for fabricating a laminated display panel 502, according to various embodiments. Display panel 502 is shown to be in position for exposure to EM energy from one or more EM energy sources 504. Display panel 502 is conveyed to this position on chuck 506 subsequent to being laminated by roller 508. Coinciding with such EM energy exposure, one or more openings 510 apply pressurized air onto display portion 502. Openings 510 are located proximal to a first (e.g., upper) side of display panel 502 while EM energy sources 504 are located proximal to a second (e.g., lower) side, opposite the first side, of display panel 502. In one implementation, chuck 506 is transparent to EM energy so as to allow adhesive seal material in display panel 502 to be exposed to EM energy from EM energy sources 504. In another implementation, chuck 506 is configured with apertures so as to allow seal material in display panel 502 to be exposed to EM energy from EM energy sources 504. EM energy sources 504 can be positioned uniformly along a perimeter of display panel 502 so that seal material along the perimeter of display panel 502 is substantially uniformly exposed to EM energy. Openings 510 can be positioned uniformly across the area of display panel 502 so that the pressurized air is applied substantially uniformly across display panel 502.

Figure 6:
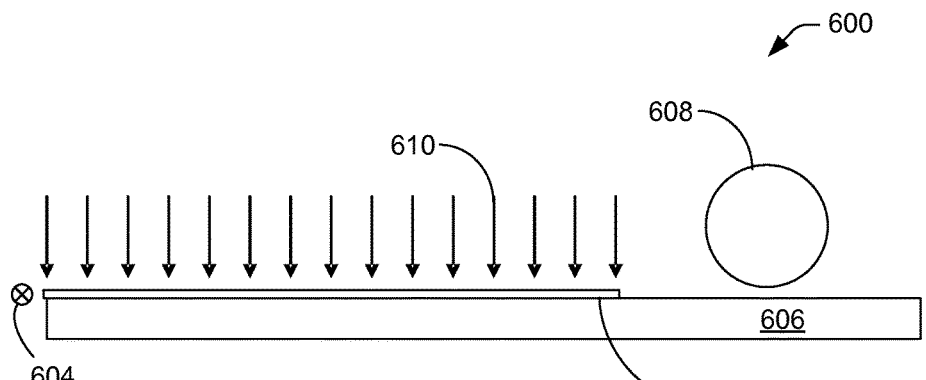

FIG. 6 is a schematic diagram of an apparatus 600 for fabricating a laminated display panel 602, according to various embodiments. Display panel 602 is shown to be in position for exposure to EM energy from one or more EM energy sources 604. Display panel 602 is conveyed to this position on chuck 606 subsequent to being laminated by roller 608. Coinciding with such EM energy exposure, one or more openings 610 apply pressurized air onto display panel 602. Openings 610 are located proximal to a first (e.g., upper) side of display panel 602 while EM energy sources 604 are located at or near an edge of display panel 602. In one implementation, EM energy sources 604 are located at a plurality of positions along a perimeter of display panel 602 so that seal material along the perimeter of display panel 602 is substantially uniformly exposed to EM energy. Openings 610 can be positioned uniformly across the area of display panel 602 so that the pressurized air is applied substantially uniformly across display panel 602. Positioning EM energy sources 604 at or near an edge (or edges) of display panel 602 allows EM energy to transmit into the edge(s) of display panel 602 and be optically light guided (e.g., via total internal reflection) to adhesive seal material in display panel 602, as described in detail below.

Figure 7:
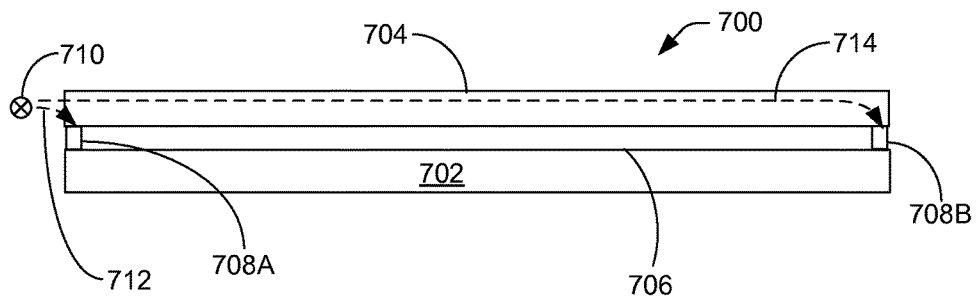
FIG. 7 is a side view of a laminated display panel transmitting light to cure seal material of the laminated display panel, according to various example embodiments.

FIG. 7 is a schematic side view diagram of a laminated display panel 700 transmitting light to cure a seal of the display panel, according to various example embodiments. Display panel 700 comprises a first support plate 702 and a second support plate 704. A region 706 between first support plate 702 and second support plate 704 includes, among other things, immiscible liquid, pixel walls, and spacers, which are not shown in FIG. 7 for the sake of clarity. Also, thicknesses of first support plate 702 and second support plate 704 are exaggerated for clarity. In the schematic side view diagram, adhesive seal material 708A and 708B is disposed at or near edges of display panel 700 between first support plate 702 and second support plate 704. Seal material 708A and 708B seals the edges to enclose the immiscible liquid in display panel 700. Seal material, including portions 708A and 708B, is located along the perimeter of display panel 700.

First support plate 702 and/or second support plate 704 are transparent to EM energy and have a refractive index favorable to total internal reflection for transmitting light incident at less than a critical angle. One or more EM energy sources 710 are at one or more locations around the edges (e.g., perimeter) of display panel 700. In some implementations, EM energy sources 710 are positioned so that EM energy enters an edge of second support plate 704 (as shown in FIG. 7). In other implementations, EM energy sources 710 are positioned so that EM energy enters an edge of first support plate 704. In still other implementations, EM energy sources 710 are positioned so that EM energy enters edges of first support plate 702 and second support plate 704.

As mentioned above, positioning EM energy sources 710 at or near an edge (or edges) of display panel 700 allows EM energy to transmit into the edge(s) of display panel 700 and be optically light guided (e.g., via total internal reflection) to seal material 708 in display panel 700. For example, arrow 712 indicates a EM energy path from EM energy source 710 to seal material 708A via an edge of second support plate 704. Additionally, arrow 714 indicates another EM energy path from EM energy source 710 to seal material 708B via an edge and substantial length of second support plate 704. Second support plate 704 acts as a light guide to transmit EM energy from EM energy source 710 to seal material 708B.

Figure 8:
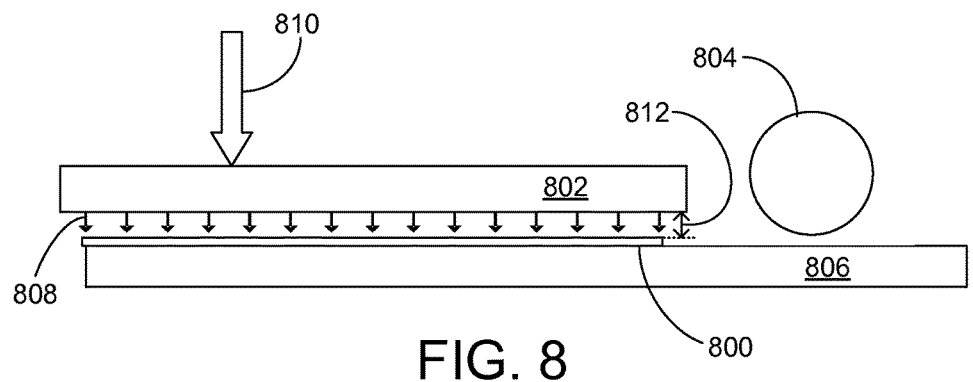
FIG. 8 is a schematic diagram demonstrating an application of an air film onto a laminated display panel, according to various example embodiments.

FIG. 8 is a schematic diagram demonstrating an application of pressurized air onto a laminated display panel 800, according to various embodiments. For example, display panel 800 is positioned below an air film apparatus 802 shortly (e.g., seconds or minutes) after exiting from beneath a laminating roller 804. In some embodiments, display panel 800 supported by a chuck 806 is conveyed with respect to fixed air film apparatus 802. In other embodiments, air film apparatus 802 is moved into position with respect to display panel 800 and chuck 806 that are fixed.

As described above, display panel 800 can be positioned below a EM energy-curing station (e.g., EM energy-curing station 406, shown in FIG. 4A) to cure seal material in display panel 800 in a curing process that exposes the seal material to EM energy. During such a process, air film apparatus 802 applies pressurized air on display panel 402 to maintain a force on display panel 800. Maintaining a force on display panel 800 assures that support plates of display panel 800 remaining tightly pressed to one another after application of a coupling force by roller 804 has passed. Without pressurized air, the support plates can pull away from one another in a process of material relaxation. Once the seal material has had a chance to cure by exposing the seal material to EM energy over a period of time, then the physical structure of display panel 800 is stable.

In some embodiments, air film apparatus 802 includes one or more openings 808 that output a jet of pressurized air. A main air intake 810 provides air for openings 808. A distance 812 between a surface of display panel 800 and exit regions of openings 808 can be adjusted depending on the desired force on display panel 800, the desired degree of homogeneity of force to accommodate thickness variations in display panel 800, number of openings 808, positions of openings 808, and pressure of air exiting openings 808, just to name a few examples. Distance 812 may also be adjusted to allow for EM energy from EM energy sources (e.g., EM energy sources 414, shown in FIG. 4A) to reach desired portions (e.g., seal material) of display panel 800. In some implementations, distance 812 can be about 0.1 millimeters, air film apparatus 802 can include a single opening or as many as many as fifty or so openings.

Figure 9:
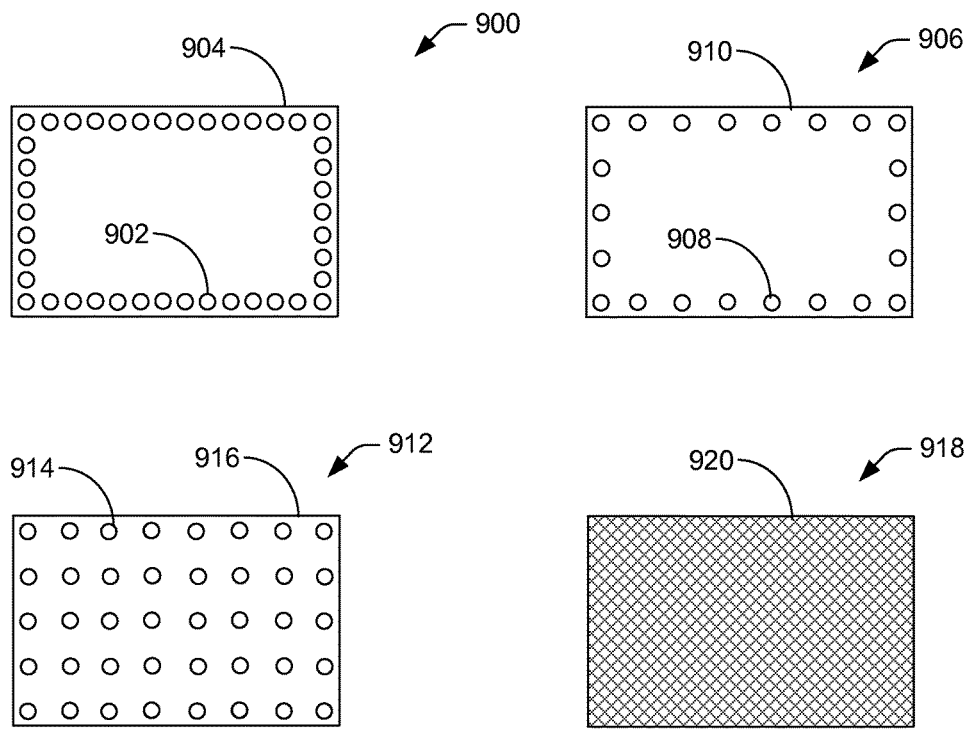
FIG. 9 illustrates various opening configurations for applying an air film onto a laminated display panel, according to various example embodiments.

FIG. 9 shows plan views of various opening configurations for applying pressurized air onto a laminated display panel, according to various example embodiments. Opening configurations can include any of a number of geometries, such as elongated slits, circles, or ovals, just to name a few examples. A display panel can have any size and any aspect ratio. In one example, a display panel can have a width of about 300 millimeters and a length of about 400 millimeters. In another example, a display panel can have a diagonal dimension of about 2.5 inches. In still other examples, display panels can have diagonal dimensions in the range of meters, and claimed subject matter is not limited in this respect.

Embodiment 900 includes a plurality of openings 902 along a perimeter of an air film apparatus 904. For example, openings 902 may be particularly positioned to be in close proximity to seal material along a perimeter of a display panel. Openings can be spaced from one another by about a centimeter, for example. Embodiment 906 includes a plurality of openings 908 along a perimeter of an air film apparatus 910. For example, openings 908 may be particularly positioned to be in close proximity to seal material along a perimeter of a display panel. Fewer openings 908, however, are present compared to embodiment 900. Number and/or concentration of openings of an air film apparatus can be selected based on the distance between a surface of a display panel and exit regions of the openings, the desired concentration of force on the display panel, the desired degree of homogeneity of the force, and the pressure of air exiting the openings, just to name a few examples. Number and/or concentration of openings of an air film apparatus can also be selected to allow for EM energy from EM energy sources (e.g., EM energy sources 414, shown in FIG. 4A) to reach desired portions (e.g., seal material) of the display panel.

Embodiment 912 includes a plurality of openings 914 uniformly located along a perimeter and a central region of an air film apparatus 916. For example, openings 914 may be particularly positioned to be in close proximity to seal material along a perimeter of a display panel while being in positions to apply a uniform force on the entire area of the display panel.

Embodiment 918 comprises an air film apparatus 920 including a porous material (e.g., in contrast to a sealed plate that includes holes, as in embodiments 900, 906, and 912). For example, air film apparatus 920 may be positioned in close proximity to a display panel to apply a uniform force on a portion of the display panel or the entire area of the display panel. In some implementations, the porous material provides a uniform air flow over the entire air film apparatus. In other implementations, the porous material provides a non-uniform air flow so that air flow over some portions (e.g., the perimeter) of the display panel is different from air flow over other portions (e.g., a central region) of the display panel.

Figure 10:
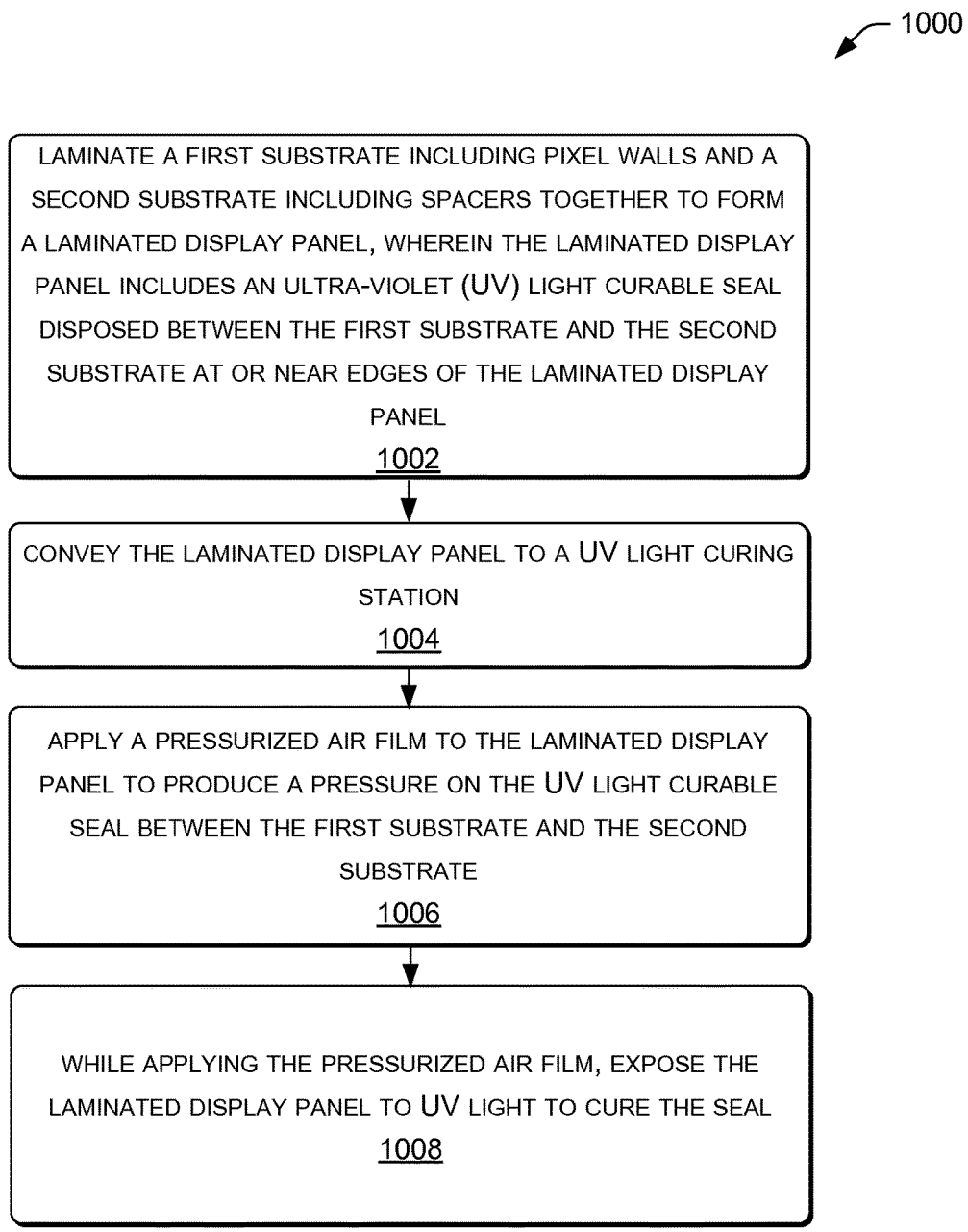
FIG. 10 is a flow diagram of a process for fabricating a laminated display panel, according to various example embodiments.

FIG. 10 is a flow diagram of a process 1000 for fabricating a laminated display panel, such as an electro-wetting display panel, according to various example embodiments. For example, apparatus 400 shown in FIG. 4A can be used to perform process 1000. At block 1002 a first support plate including pixel walls and a second support plate including spacers are laminated together to form a laminated display panel. In some implementations, such lamination is performed by a rolling process, though claims subject matter need not be so limited. The laminated display panel includes a EM energy-curable seal disposed between the first support plate and the second support plate at or near edges of the laminated display panel. At block 1004, the laminated display panel is conveyed to a EM energy curing station, such as EM energy-curing station 406 shown in FIG. 4A. At block 1006, pressurized air is applied to the laminated display panel to produce a pressure on the EM energy-curable seal between the first support plate and the second support plate. At block 1008, while applying the pressurized air, the laminated display panel is exposed to EM energy to cure the seal. In some implementations, the one or more light sources producing the EM energy are located on a side of the laminated display panel opposite to a side of the laminated display panel to which the pressurized air is applied. Moreover, in some implementations, excess electrolyte disposed between the first support plate and the second support plate is squeezed out from between the first support plate and the second support plate of the laminated display panel in response to applying the pressurized air.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

One skilled in the art will realize that a virtually unlimited number of variations to the above descriptions are possible, and that the examples and the accompanying figures are merely to illustrate one or more examples of implementations.

It will be understood by those skilled in the art that various other modifications can be made, and equivalents can be substituted, without departing from claimed subject matter. Additionally, many modifications can be made to adapt a particular situation to the teachings of claimed subject matter without departing from the central concept described herein. Therefore, it is intended that claimed subject matter not be limited to the particular embodiments disclosed, but that such claimed subject matter can also include all embodiments falling within the scope of the appended claims, and equivalents thereof.

In the detailed description above, numerous specific details are set forth to provide a thorough understanding of claimed subject matter. However, it will be understood by those skilled in the art that claimed subject matter can be practiced without these specific details. In other instances, methods, apparatuses, or systems that would be known by one of ordinary skill have not been described in detail so as not to obscure claimed subject matter.

Reference throughout this specification to "one embodiment" or "an embodiment" can mean that a particular feature, structure, or characteristic described in connection with a particular embodiment can be included in at least one embodiment of claimed subject matter. Thus, appearances of the phrase "in one embodiment" or "an embodiment" in various places throughout this specification are not necessarily intended to refer to the same embodiment or to any one particular embodiment described. Furthermore, it is to be understood that particular features, structures, or characteristics described can be combined in various ways in one or more embodiments. In general, of course, these and other issues can vary with the particular context of usage. Therefore, the particular context of the description or the usage of these terms can provide helpful guidance regarding inferences to be drawn for that context.

What is claimed is:

1. A method comprising:
placing a colored oil on a first support plate that includes pixel walls, wherein a depth of the colored oil is less than a height of the pixel walls;
placing an electrolyte solution that is immiscible with the colored oil on the colored oil such that the electrolyte solution covers tops of the pixel walls;
placing an electromagnetic (EM) energy curable seal between the first support plate and a second support plate proximate to edges of the first support plate or the second support plate;
laminating by roll-coupling the first support plate and the second support plate together to form a laminated electrowetting display panel, wherein the second support plate includes spacers, and wherein the roll-coupling squeezes out excess electrolyte solution from between the first support plate and the second support plate while the colored oil remains among the pixel walls;

applying pressurized air to the laminated electrowetting display panel to produce a pressure between the first support plate and the second support plate; and while applying the pressurized air, exposing at least one or more edges of the laminated electrowetting display panel to EM energy, at least a portion of the EM energy travelling by internal reflection through at least one of the first support plate or the second support plate to the seal to at least partially cure the seal.

2. The method of claim 1, further comprising:

exposing a first side of the laminated electrowetting display panel to one or more sources producing the EM energy, wherein the first side is located opposite to a second side of the laminated electrowetting display panel to which the pressurized air is applied.

3. A method comprising:

placing a fluid and an electrolyte solution that is immiscible with the fluid on a first support plate that includes pixel walls, wherein a depth of the fluid is less than a height of the pixel walls and the electrolyte solution covers tops of the pixel walls;

aligning the pixel walls protruding from the first support plate with spacers protruding from a second support plate;

roll-coupling the first support plate and the second support plate together to form a laminated display panel that includes a seal disposed proximate to edges of the laminated display panel, wherein the pixel walls and the spacers are in contact with one another, and wherein the roll-coupling squeezes out excess electrolyte solution from between the first support plate and the second support plate while the fluid remains among the pixel walls;

applying pressurized gas to the laminated display panel to produce a coupling pressure between the first support plate and the second support plate; and exposing at least one or more edges of the laminated display panel to an electromagnetic (EM) energy source, at least a portion of the EM energy from the EM energy source travelling by internal reflection through the first support plate or the second support plate to the seal for at least partially curing the seal.

4. The method of claim 3, wherein applying the pressurized gas to the laminated display panel further comprises:

applying the pressurized gas substantially on the edges of the laminated display panel to produce the coupling pressure on the seal between the first support and the second support plate.

5. The method of claim 3, wherein exposing the one or more edges of the laminated display panel to the EM energy source further comprises:

exposing at least a portion of the laminated display panel to the EM energy source while the roll-coupling is applied to at least another portion of the laminated display panel.

6. The method of claim 3, wherein applying the pressurized gas to the laminated display panel further comprises exposing at least a portion of the laminated display panel to the pressurized gas while the roll-coupling is applied to at least another portion of the laminated display panel.

7. The method of claim 3, wherein the EM energy source comprises an ultraviolet (UV) light source.

8. The method of claim 3, wherein the pressurized gas comprises pressurized air or pressurized fluid.

9. The method of claim 3, further comprising:

exposing a first side of the laminated display panel to the EM energy source, wherein the first side is located opposite to a second side of the laminated display panel to which the pressurized gas is applied.

10. The method of claim 3, wherein the laminated display panel comprises an electro-wetting display panel.

11. The method of claim 3, wherein the laminated display panel comprises an electrophoretic display panel.

12. The method of claim 3, wherein applying the pressurized gas to the laminated display panel further comprises:

applying the pressurized gas using a gas film apparatus; and at least partially constraining the pressurized gas between the laminated display panel and the gas film apparatus to form a pressurized gas film.

13. The method of claim 3, wherein additional excess fluid is disposed between the first support plate and the second support plate, and wherein applying pressurized gas to the laminated display panel further comprising:

squeezing the additional excess fluid out from between the first support plate and the second support plate of the laminated display panel.

14. A method comprising:

placing a first fluid and a second fluid that is immiscible with the first fluid on a first support plate that includes pixel walls, wherein a depth of the first fluid is less than a height of the pixel walls and the second fluid covers tops of the pixel walls;

roll-coupling the first support plate and a second support plate together to form a laminated display panel that includes a seal disposed proximate to edges of the laminated display panel, wherein the roll-coupling removes a first portion of the second fluid while the first fluid remains among the pixel walls;

applying pressurized gas to the laminated display panel to produce a coupling pressure between the first support plate and the second support plate and to remove a second portion of the second fluid while the first fluid remains among the pixel walls; and exposing the laminated display panel to an electromagnetic (EM) energy source to at least partially cure the seal.

15. The method of claim 14, wherein exposing the laminated display panel to the EM energy source comprises:

exposing at least one edge of the laminated display panel to the EM energy source, the EM energy from the EM energy source light-guided by internal reflection through the first support plate and/or the second support plate to the seal.

* * * * *